Figure 1:
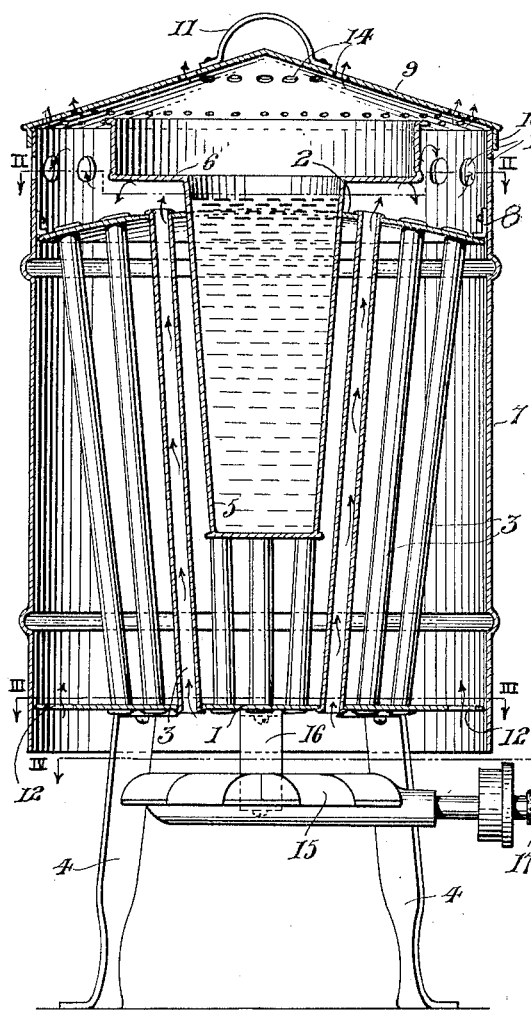

J. L. SKUTTLE.
GAS HEATER.
APPLICATION FILED FEB. 5, 1921.

1,384,493. Patented July 12, 1921.

Inventor
J. L. Skuttle
By Milton E. Lowry
Attorney

UNITED STATES PATENT OFFICE.

JOHN L. SKUTTLE, OF MASON CITY, IOWA.

GAS-HEATER.

1,384,493.  Specification of Letters Patent.  Patented July 12, 1921.

Application filed February 5, 1921. Serial No. 442,732.

*To all whom it may concern:*

Be it known that I, JOHN L. SKUTTLE, a citizen of the United States of America, residing at Mason City, in the county of Cerro Gordo and State of Iowa, have invented certain new and useful Improvements in Gas-Heaters, of which the following is a specification.

This invention relates to certain new and useful improvements in gas heaters and has particular reference to a portable gas heating stove capable of manufacture in various sizes for heating rooms or buildings of different areas.

The primary object of the invention is to provide a gas heater in the form of a portable device that may be easily shifted from one position to another and embodying a gas jet or Bunsen burner adjacent the lower end thereof with the heating units directed upwardly through flues confined within a casing.

A further object of the invention embodies a gas heater including a plurality of concentrically arranged heating flues with a water receptacle suspended centrally thereof for producing a sufficient quantity of vapor to humidify the air to eliminate the destroying of the oxygen in the air, and for efficient heating purposes.

A still further object of the invention has reference to a gas heater embodying a plurality of heating flues with a water receptacle or pan detachably mounted within the heater and a perforated casing inclosing the heater and pan with the perforated removable cover for the casing.

With the above general objects in view, and others that will become apparent as the nature of the invention is better understood, the same consists in the novel form, combination and arrangement of parts hereinafter more fully described and shown in the accompanying drawing, in which like reference characters indicate corresponding parts throughout the several views.

In the drawing,

Figure 1 is a vertical sectional view of a gas heater constructed in accordance with the present invention showing the heating flues supported in the upper and lower plates with the water pan suspended by the walls of a central opening formed in the upper flue plate.

Figure 2:
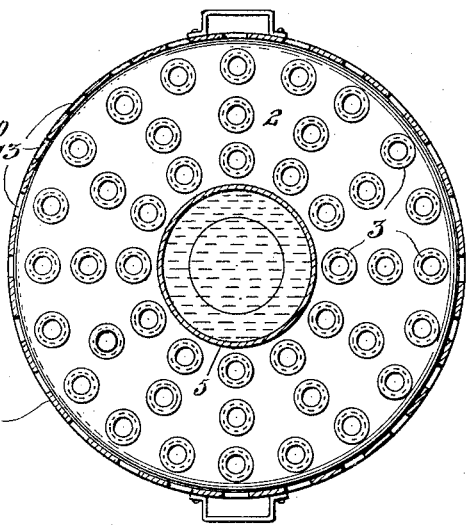
Figure 3:
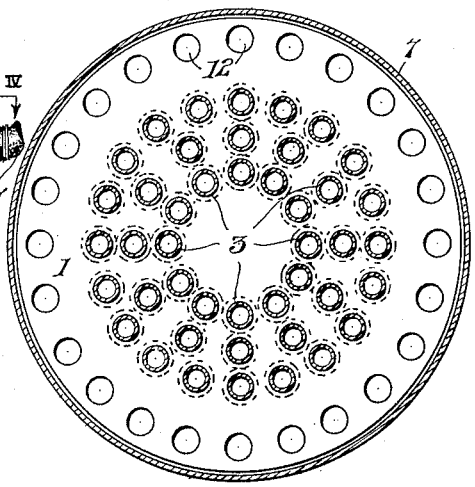
Figure 4:
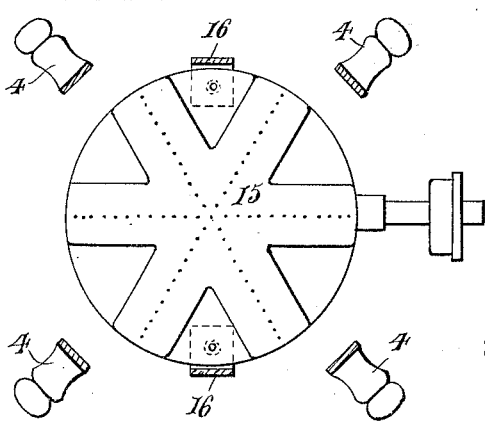

Fig. 2 is a horizontal sectional view taken on line II—II of Fig. 1 showing the side perforations in the inclosing casing and the upper ends of the flues anchored in the head plate, Fig. 3 is a horizontal sectional view taken on line III—III of Fig. 1 showing the lower ends of the flues anchored in the base plate of the heating frame with the circular series of air in the openings in the base plate and Fig. 4 is a horizontal sectional view taken on line IV—IV of Fig. 1 showing the gas burner positioned beneath the heating frame.

Briefly described, the present invention aims to provide a gas heater with a water pan attachment for properly humidifying the heated air to eliminate the consumption of the oxygen in the air, the same including a base plate and a head plate having heat passage flues anchored therein. Supporting feet for the heater are carried by the base plate and a casing having a lower open end incloses the plates and flues with brackets carried thereby for resting upon the head plate. A central opening is formed in the head plate and a water pan including a conical base portion is suspended within the opening and supported by the side walls thereof with the casing cover overlying the water pan and having air passage openings therein. A Bunsen burner is supported by the base plate and has a flexible tube connection with a gas supply jet.

Describing the invention more in detail, the heater includes a base plate 1 of disk formation and a dome-shaped head plate 2 spaced upwardly thereof, the plates being connected by tubular heating flues 3 suitably anchored at their ends in the plates 1 and 2, the flues being arranged in concentric series as shown in Figs. 2 and 3. Supporting legs 4 are suitably secured to the base plate 1 at points inwardly of the periphery thereof for holding the heating device at the desired elevation from the floor line.

To provide for the proper humidifying of the heated air, a water receptacle is supported within the heating flues 3, the head plate 2 being provided with a central opening for receiving the relatively long cone-shaped receptacle 5 supported by the walls of the head opening, the upper end of the receptacle 5 carrying an enlarged pan-shaped head 6 overlying the open upper ends of the adjacent flues 3.

An inclosing casing and cover incases the heating flues and water receptacle, the same embodying an outer side wall 7 carrying angle brackets 8 upon the inner face thereof adjacent the upper end for resting upon the peripheral edge of the head plate 2 while the lower end of the casing wall terminates at a point below the base plate 1. A removable cover 9 is supported on the upper end of the casing 7 and has a depending flange 10 inclosing the upper end of the casing and a handle 11 for adjusting the same. To provide for the proper circulation of heated air and for the ingress of fresh air to the heater, the base plate 1 is provided with a circular series of air inlet openings 12 adjacent the peripheral edge thereof as shown in Figs. 1 and 3, while the upper end of the casing 7 is provided with lateral air outlet openings 13, the cover 9 being similarly perforated as at 14 to permit the escape of heated air to the room.

The gas burner 15 is disposed beneath the base plate 1 and is carried by mounting brackets 16 connected to the base plate as shown in Figs. 1 and 4, a flexible tube 17 connecting the burner 15 to a suitable source of gas supply.

In the operation of the device, the flame from the burner 15 is directed against the base plate 1 and upwardly through the flues 3, heat radiating from the inner and outer faces of the flue walls with the open ends of the inner circular series of flues discharging in contact with the pan head 6 of the water receptacle 5. Fresh air is admitted through the openings 12 in the base plate 1 and is heated within the casing 7 for vaporizing the water within the receptacle 5, the vapors rising from the body of water being suitably heated within the pan 6 and escaping through the side openings 13 in the casing 7 and through the openings 14 in the casing cover 9. The base and head plates, and the heating flues may be constructed of a suitable metal to withstand the heat from the burner 15 and with the addition of the water receptacle 5, the device is especially adapted for sick rooms, insuring the proper humidity in the heated air and eliminating consumption of the oxygen. It is not intended that this invention be limited to the exact arrangement disclosed as the heater may be constructed in various designs as round, rectangular, or polygonal, the invention principally residing in the fact that the heating flues 3 with the base plate 1 are disposed directly over the burner 15 to utilize all of the heat energy and to insure the perfect humidity of the air at all times. For purposes of cleaning and repair, the water receptacle 5 is readily removable from the head plate 2, by first removing the cover 9 and lifting the water receptacle from the head plate in an obvious manner, the water receptacle being supported in the central opening of the head plate by the tapering side walls thereof. The casing 7 also being removable, the flues 3 are readily accessible for cleaning and repair, the present invention providing a neat and compact vapor gas heater that is extremely simple in construction and durable in use.

While there is herein shown and described the preferred embodiment of the invention, it is to be understood that minor changes may be made without departing from the spirit and scope of the same as claimed.

What is claimed as new is:

1. In a heater of the character described, a plurality of heating flues, head and base plates connecting the flues, a heater disposed beneath the base plate, a casing inclosing the plates and flues, there being a central opening in said head plate and a tapering water receptacle suspended within the head plate opening.

2. In a heater of the character described, a plurality of heating flues, head and base plates connecting the flues, a heater disposed beneath the base plate, a casing inclosing the plates and flues, there being a central opening in said head plate, a tapering water receptacle suspended within the head plate opening and a pan-shaped head carried by the upper end of the water receptacle.

3. In a heater of the character described, a plurality of heating flues, head and base plates connecting the flues, a heater disposed beneath the base plate, a casing inclosing the plates and flues, there being a central opening in said head plate, a tapering water receptacle suspended within the head plate opening, a pan-shaped head carried by the upper end of the water receptacle and extending laterally thereof for overlying the open upper ends of the adjacent flues.

4. A gas heater of the type described comprising a plurality of heating flues, base and head plates connecting the flues, a water receptacle disposed centrally of the flues and a casing removably supported on the head plate.

5. A gas heater of the type described comprising a plurality of heating flues, base and head plates connecting the flues, a water receptacle disposed centrally of the flues, a casing inclosing the flues and water receptacle and angle brackets carried by the casing engaging the head plate to support the casing on the head plate.

6. In a gas heater, a head and base plate, concentric rows of flues connecting the plates, said head plate having a central opening therein, a cone-shaped water receptacle suspended within said opening and supported therein by the walls of the receptacles engaging the walls of the opening and a pan-shaped head carried by the upper end of the receptacle overlying the open upper ends of the adjacent flues.

In testimony whereof I affix my signature.

JOHN L. SKUTTLE.